United States Patent
Blaha

Patent Number: 5,412,716
Date of Patent: May 2, 1995

[54] SYSTEM FOR EFFICIENTLY POWERING REPEATERS IN SMALL DIAMETER CABLES

[75] Inventor: Matthew S. Blaha, Hanover Township, Morris County, N.J.

[73] Assignee: AT&T Bell Laboratories, Murray Hill, N.J.

[21] Appl. No.: 56,085

[22] Filed: May 3, 1993

[51] Int. Cl.6 .............................................. H04B 3/44
[52] U.S. Cl. ................... 379/338; 379/348; 379/340; 379/399; 379/398; 379/413; 174/70 S
[58] Field of Search ............... 379/338, 340, 347, 348, 379/398, 399, 400, 413; 174/70 S, 102 R, 68.1, 70 R

[56] References Cited

U.S. PATENT DOCUMENTS

| | | | |
|---|---|---|---|
| 2,079,689 | 1/1933 | Gorton | 379/348 |
| 2,846,509 | 12/1956 | Dubuar | 379/340 |
| 3,535,472 | 7/1967 | Babbitt | 379/348 |
| 3,644,787 | 2/1972 | Hamilton | 379/348 |
| 3,676,613 | 7/1972 | Brewer | 379/348 |
| 3,816,673 | 6/1974 | Miya | 174/70 S |
| 3,835,334 | 9/1974 | Notteau | 379/348 |
| 3,868,484 | 2/1975 | Bolton et al. | 379/348 |
| 3,903,378 | 9/1975 | Lee et al. | 379/340 |
| 4,136,267 | 1/1979 | Foster et al. | 379/347 |

FOREIGN PATENT DOCUMENTS

| | | | |
|---|---|---|---|
| 0140914 | 12/1978 | Japan | 379/348 |
| 0022116 | 2/1979 | Japan | 379/348 |
| 0109312 | 8/1979 | Japan | 379/348 |

Primary Examiner—James L. Dwyer
Assistant Examiner—M. W. Shehata
Attorney, Agent, or Firm—Charles E. Graves

[57] ABSTRACT

A system of impedance matching is provided to match the total impedance of the cable system to the total impedance of the powered elements such as the repeaters. The source impedance of the power supplies may be considered as part of the cable impedance. By matching impedances, the source voltage for driving the electronics is advantageously minimized.

2 Claims, 1 Drawing Sheet

SYSTEM FOR EFFICIENTLY POWERING REPEATERS IN SMALL DIAMETER CABLES

FIELD OF THE INVENTION

This invention relates to telecommunications cable systems and, more particularly, to providing adequate electrical power to amplifiers and other powered apparatus in small diameter cable systems.

BACKGROUND OF THE INVENTION

In typical repeatered buried or undersea telecommunications or telemetric cable systems, the cable is designed to have substantial cross-section for strength and robustness. The electrical conductor of the cable may therefore be large without adversely affecting the overall cable characteristics. The cable conductor has relatively low resistivity, on the order of 0.5-2 ohms per kilometer. The repeaters are powered by placing them in series with the cable conductor and feeding the power from a constant current source which provides for a small voltage drop across each repeater.

In response to demand for less costly and more readily deployable cable systems, cable designs of substantially reduced diameter have been introduced. These systems use substantially less conductor for power transmission. The resistivity of such cables thus is substantially greater than earlier designs, on the order typically of 20 ohms per kilometer. Such a cable is less capable of carrying electrical power because to deliver the wattage required by the amplifiers requires an increase in the source voltage that necessitates an increase in the polyethylene dielectric strength. Adding polyethylene thickness to provide dielectric strength is, of course, incompatible with achieving the small overall cable diameter. Moreover, high voltages transmitted over small diameter cables cause cable failures more frequently at points where the cable sheathing may be kinked or damaged. As a result, the maximum length of small diameter undersea or terrestrial cable systems has been limited.

SUMMARY OF THE INVENTION

This invention applies the concept of impedance matching to match the total impedance of the cable system to the total impedance of the powered elements such as the repeaters. The source impedance of the power supplies may be considered as pan of the cable impedance. By matching impedances, the source voltage for driving the electronics is advantageously minimized.

In a specific embodiment of the invention applied to a cable system with several repeaters or other power-consuming elements, the known voltage drop in a particular cable section is replicated and exactly held as the voltage drop across the repeater next-in-line, by using at each repeater a clamping device such as a zener diode or a similar device, series-connected with the cable electrical conductor. The voltage across the zener diode then is convened to that required by the power element. This voltage is tapped off as the local power supply. The embodiment exhibits reliable stability as well as excellent impedance matching.

DETAILED DESCRIPTION OF AN ILLUSTRATIVE EMBODIMENT

Figure 1:
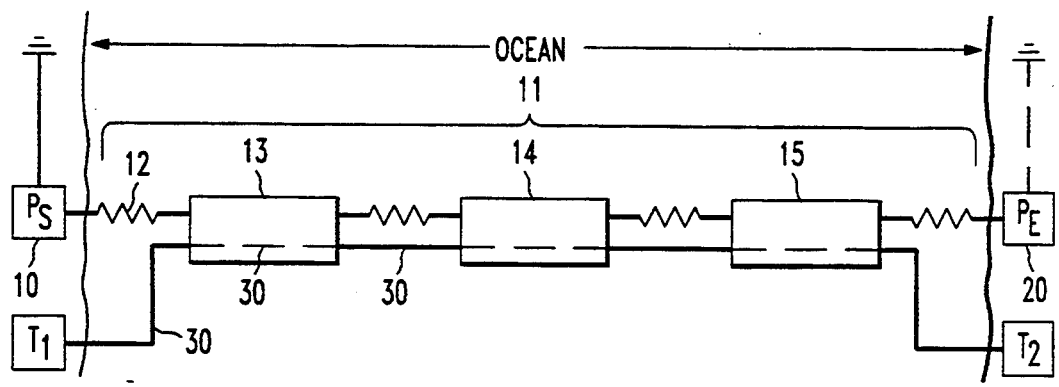
FIG. 1 is a schematic diagram of a shore-powered, repeatered submarine cable.

The submarine cable of FIG. 1 consists of a shore power source 10 and a cable system 11 connecting two shore telecommunications systems denoted t1, t2. The latter consists, for example, of multiple terminals and connections to other shore networks (not shown). Cable system 11 comprises the basic cable 12 consisting of several sections serially connected through repeater units 13, 14, 15. The communications path denoted 30 is shown separately from the power circuit.

Figure 2:
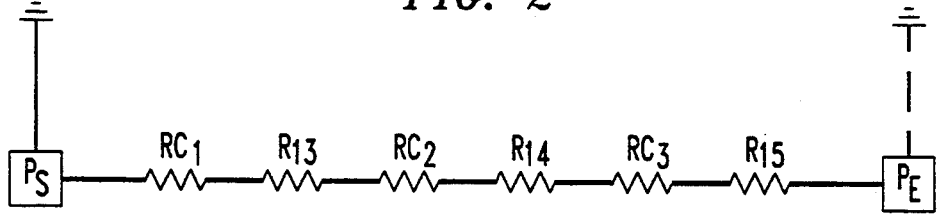
FIG. 2 is a circuit diagram of the resistive elements of the cable power system.
Figure 3:
FIG. 3 is a circuit diagram of the equivalent electric circuit of the FIG. 2 system.

The amplification circuitry at each of the repeaters 13, 14, 15 occasions some amount of voltage drop across each repeater depending on each repeater's load resistance. In FIG. 2, the repeater load resistances are denoted R13, R14, R15. Each of the several sections of the cable 12 also has end-to-end resistance, these resistance values being denoted RC1, RC2, RC3 in FIG. 2. Thus, the total series resistance of the power circuitry from the output of source 10 to the power termination 20 is the sum of RC1, R13, RC2, R14, RC3, R15 as shown in FIG. 2. Considering the separate sums of the cable section resistances and the repeater resistances, the equivalent circuit of FIG. 2 is as shown in FIG. 3, wherein the total cable resistance is denoted Rc and the total repeater resistance is denoted Rr.

With the object of delivering the required wattage to each of the repeaters while using the lowest possible source voltage in accordance with the invention, the voltage drop across each repeater 13, 14, 15 is artificially increased so that the total of the voltage drop across all the loads (Rr in this example) is equal to the total voltage drops along the cable (Rc). If all loads are not the same, then the total voltage drop across all of the loads is allocated according to the power that each individual load requires to achieve maximally efficient power transfer. It is seen that by this expedient the load resistances are matched to the aggregate cable resistances. When achieved efficiently, the result is a maximally efficient power transfer enabling a small diameter cable system to be powered using a minimum source voltage.

Figure 4:
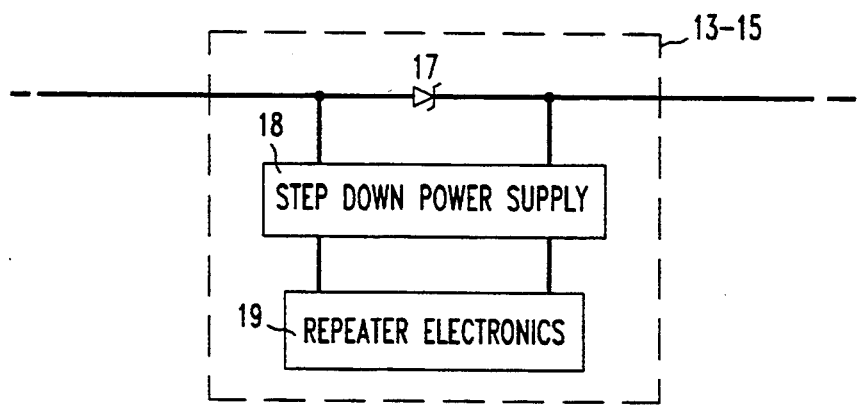
FIG. 4 is a schematic block diagram of the power circuit at each repeater.

In accordance with a specific implementation of the invention, as illustrated in FIG. 4, clamping devices such as zener diode 17 are provided in series relation with the power conductor. The zener diodes assure that the power system will remain stable and will not oscillate, despite the potential for oscillation caused by the use of multiple step-down switching voltage converters in series.

In the case of DC-powered systems, a DC-to-DC voltage converter 18 is provided to operate the electronic circuitry. Converter 18 is powered by a connection across diode 17. Converter 18 drops the relatively high clamped voltage across diode 18 from the typical 20-100 Vdc to the lower voltage required by the electronics. The reduced voltage available from converter 18 then powers the electronic circuitry 19 of each repeater.

The invention extends the distance over which a given repeatered small diameter cable can be deployed.

It also increases the reliability of the small cable system by lowering the required source voltage and thereby reducing the potential for high voltage induced cable failures. Further, for a given deployment distance and repeater power, by using the invention, the cable size (and therefore cable costs) can be reduced while cable reliability can still be improved.

I claim:

1. A DC-powered telecommunications cable transmission system, comprising:

(a) a plurality of series-connected cable sections, each section comprising an electrical conductor, and each of said conductors having a predetermined end-to-end resistance;

(b) a plurality of repeaters, each repeater comprising electronic amplifying means serially connected with said electrical conductors of said cable sections, with the load resistance of each individual said repeater being substantially different from that of any other said repeater;

(c) at least one voltage source connected to one or both ends of said series-connected repeaters for powering said repeaters;

(d) a step-down DC-to-DC power converter connected across each said repeater for reducing the voltage supplied to each said amplifying means; and (e) a plurality of zener diodes serially connected in the path of said conductors, each said diode being connected across a one of said repeaters and also across a one of said power converters, said diodes being selected so as to increase the voltage drop across each said repeater so that the total of the voltage drops across all said repeaters is equal to the total voltage drops across the aggregate of said cable section conductors, thereby to prevent said circuit from oscillating in the presence of said voltage converters.

2. Apparatus in accordance with claim 1, wherein the voltage drop across each said zener diode is further selected so as to minimize the source voltage required to power a complete said system.

* * * * *